(12) United States Patent
Brunzema

(10) Patent No.: US 12,229,543 B2
(45) Date of Patent: Feb. 18, 2025

(54) MAINTAINING COMPUTING ENVIRONMENTS USING OPERATOR WITH DYNAMICALLY UPDATABLE STATE

(71) Applicant: SAP SE, Walldorf (DE)

(72) Inventor: Martin Brunzema, Berlin (DE)

(73) Assignee: SAP SE, Walldorf (DE)

( * ) Notice: Subject to any disclaimer, the term of this patent is extended or adjusted under 35 U.S.C. 154(b) by 293 days.

(21) Appl. No.: 17/453,721

(22) Filed: Nov. 5, 2021

(65) Prior Publication Data

US 2023/0147631 A1   May 11, 2023

(51) Int. Cl.
| | |
|---|---|
| G06F 9/44 | (2018.01) |
| G06F 8/65 | (2018.01) |
| G06F 11/30 | (2006.01) |
| H04L 41/0816 | (2022.01) |
| H04L 41/0853 | (2022.01) |

(52) U.S. Cl.
CPC ............ *G06F 8/65* (2013.01); *G06F 11/3051* (2013.01); *H04L 41/0816* (2013.01); *H04L 41/0853* (2013.01)

(58) Field of Classification Search
CPC ........................................................ G06F 8/65
USPC ........................................................ 717/168
See application file for complete search history.

(56) References Cited

U.S. PATENT DOCUMENTS

| | | | |
|---|---|---|---|
| 7,392,518 B1* | 6/2008 | Chhabra | ................... G06F 8/65 |
| | | | 717/173 |
| 8,108,836 B1* | 1/2012 | Campbell | ................. G06F 8/65 |
| | | | 717/127 |
| 10,346,085 B1* | 7/2019 | Teverovsky | ........ G06F 11/1438 |
| 10,379,841 B2* | 8/2019 | Wong | ....................... G06F 8/658 |
| 2006/0101455 A1* | 5/2006 | Mantani | .................... G06F 8/65 |
| | | | 717/168 |
| 2009/0172462 A1* | 7/2009 | Rothman | ............ G06F 11/0706 |
| | | | 714/2 |
| 2017/0075775 A1* | 3/2017 | Banister | .............. G06F 11/1469 |
| 2020/0257522 A1* | 8/2020 | Cheng | ....................... G06F 8/65 |

* cited by examiner

*Primary Examiner* — Evral E Bodden
(74) *Attorney, Agent, or Firm* — Klarquist Sparkman, LLP

(57) ABSTRACT

Techniques and solutions are provided to facilitate monitoring and maintaining a computing environment. A current state of one or more parameters, resources, or services of a computing environment is determined. The current state is compared with predefined state information. It is determined that the current state is inconsistent with the predefined state information. It is determined whether an update condition is present. If the update condition is not present, the computing environment is automatically updated such that the current state matches the predefined state information. If the update condition is present, the predefined state information is updated.

20 Claims, 8 Drawing Sheets

MAINTAINING COMPUTING ENVIRONMENTS USING OPERATOR WITH DYNAMICALLY UPDATABLE STATE

FIELD

The present disclosure generally relates to maintaining computing environments. Particular implementations provide computer-implemented operators that selectively take action to maintain a computing environment according to defined state information or update the defined state information based on whether an update condition is detected.

BACKGROUND

The maintenance of computing environments can be complex and time consuming. For example, it can be complex and time consuming to monitor the state of a database application, such as a database application running in a hyperscalar environment. Attempts have been made to automate the monitoring and maintenance of computing environments. In particular, software programs, such as KUBERNETES (the Linux Foundation Non-Profit Corporation), have been developed to automate deployment, scaling, and maintenance of containerized software applications (e.g., applications running within DOCKER (Docker, Inc.) containers).

Automation programs can include features that implement an "operator pattern" (or "operator"). An operator pattern provides a software agent that periodically polls the state of a computing environment. If a current state of the computing environment does not conform to a specified state, the automation program can take steps to bring the computing environment back to the specified state. Thus, maintenance can be implemented in a declarative manner (telling the operator what state to maintain), rather than using an imperative approach (where specific commands would be provided in order to alter a computing environment to maintain a state). For example, if a computing environment implements a database application, and a new database is added, an operator may be responsible for marshalling computing resources for the database and configuring the database for use.

Typically, operators are responsible for making changes to specified aspects of a computing environment that is at least partially automated. Thus, it is typically assumed that only the operator makes changes to the specified resources, and that the operator will make those changes to reach the specified state. If this assumption is not true, then an operator may produce unexpected or unwanted behavior. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided to facilitate monitoring and maintaining a computing environment. A current state of one or more parameters, resources, or service of a computing environment is determined. The current state is compared with predefined state information. It is determined that the current state is inconsistent with the predefined state information. It is determined whether an update condition is present. If the update condition is not present, the computing environment is automatically updated such that the current state matches the predefined state information. If the update condition is present, the predefined state information is updated.

In one aspect, the present disclosure provides a method for determining whether an operator should update a computing system managed by the operator or update state information used by the operator, and taking appropriate subsequent action. A current state of one or more parameters, resources, or services of a computing environment are determined. The current state is compared to predefined state information for the one or more parameters, resources, or services. It is determined that the current state is inconsistent with the predefined state information. It is determined whether an update condition is present. An action is taken based on whether an update condition is present. If an update condition is not present, the current state of the computing environment is modified to match the predefined state information. If an update condition is present, the predefined state information for the one or more parameters, resources, or services is updated.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

DETAILED DESCRIPTION

Example 1)—Overview

Figure 1:
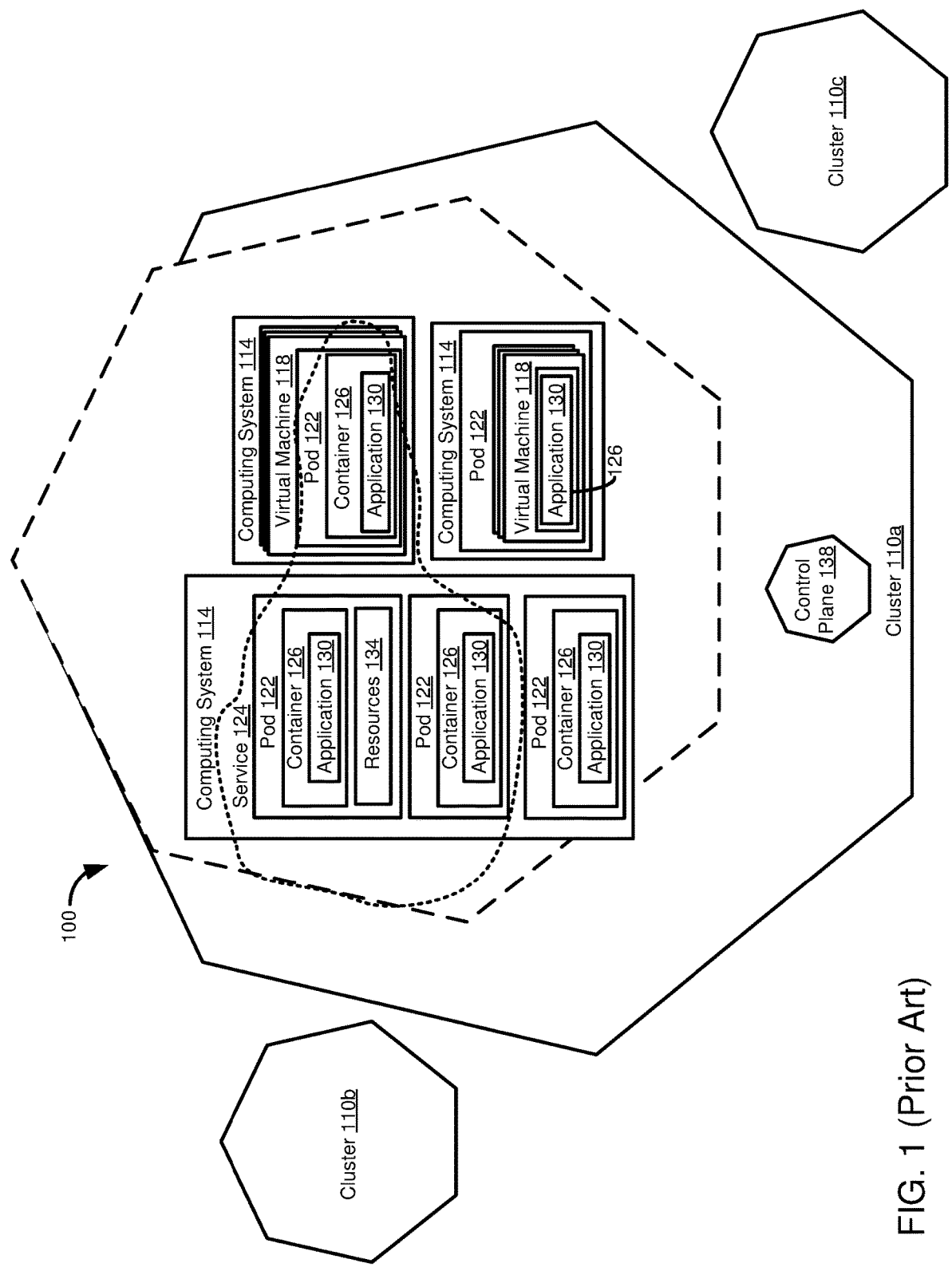
FIG. 1 is a diagram illustrating a computing environment in which containerized applications are managed automatically by software.

The maintenance of computing environments can be complex and time consuming. For example, it can be complex and time consuming to monitor the state of a database application, such as a database application running in a hyperscalar environment. Attempts have been made to automate the monitoring and maintenance of computing environments. In particular, software programs, such as KUBERNETES (the Linux Foundation Non-Profit Corporation), have been developed to automate deployment, scaling, and maintenance of containerized software applications (e.g., applications running within DOCKER (Docker, Inc.) containers).

Automation programs can include features that implement an "operator pattern" (or "operator"). An operator pattern provides a software agent that periodically polls the state of a computing environment. If a current state of the computing environment does not conform to a specified state, the automation program can take steps to bring the computing environment back to the specified state. Thus, maintenance can be implemented in a declarative manner (telling the operator what state to maintain), rather than using an imperative approach (where specific commands would be provided in order to alter a computing environment to maintain a state). For example, if a computing environment implements a database application, and a new database is added, an operator may be responsible for marshalling computing resources for the database and configuring the database for use. Thus, the claimed subject matter relates to a system where a human user does not manually manage a computing environment, and need not specify particular commands to maintain a computing environment in a desired or specified state.

Typically, operators are responsible for making changes to specified aspects of a computing environment that is at least partially automated. Thus, it is typically assumed that only the operator makes changes to the specified resources, and that the operator will make those changes to reach the specified state. If this assumption is not true, then an operator may produce unexpected or unwanted behavior. Accordingly, room for improvement exists.

The present disclosure provides technologies that can allow operator patterns to be used in environments where actors other than the operator pattern can alter a state managed by an operator pattern. In at least some cases, a change to the managed computing environment is treated by an operator as updating the state definition used by the operator to determine whether a state of a computing environment matches an expected state. Thus, rather than trying to restore a previously defined state, the operator pattern can update at least a portion of the state definition to conform with its current state (or, more generally, a different state definition), where the operator pattern will then try and maintain the updated state definition.

In another aspect, the present disclosure provides operators whose action can be suspended for a period of time. For example, some actions may take time such that a computing environment reaches a new stable state. It may be desirable for an operator to wait until such action is complete before determining whether a state needs to be updated or whether its state definition should be updated. Otherwise, for example, the action of the operator may interfere with the conflicting action.

The following Examples describe how disclosed techniques can be implemented in the specific embodiment of a computing environment using an automation platform, such as KUBERNETES, using containerized applications, such as applications running in DOCKER containers. However, disclosed technologies can be use in other environments that use an operator pattern.

A computing environment that is monitored and managed by a software operator can have advantages as compared with monitoring and managing performed by a human. For example, monitoring typically involves processing a large amount of detailed data on a very frequent basis. For instance, in a cloud environment, the amount of data may be very large as the cloud environment may be running a large number of services. In addition, if managed by a human, there may be a significant delay between when a system no longer conforms with a desired state, when such discrepancy is noted by a human, and when corrective action can be taken. The frequency at which the computing environment may need to be checked, and the large amount of data to be processed, can lead to human error. As having a computing environment differ from a desired state can be a significant issue for users of the computing environment, delay or errors in addressing problems with the computing environment can be unacceptable.

Example 2)—Example Computing Environment with Automated Management of Containerized Applications FIG. 1 illustrates an example computing environment 100 in which disclosed technologies can be implemented. The computing environment 100 can include a plurality of computing clusters 110, shown as clusters 110a-110c. Cluster 110a is illustrated showing details of components that can be included in the clusters 110. The cluster 110a can include a plurality of computing systems 114. At least a portion of the computing systems 114 can include one or more virtual machines 118.

A computing system 114, or a virtual machine 118 running within a computing system, can host one or more pods 122, where a given pod can in turn host one or more applications 130 running inside a respective container 126. At least a portion of the pods 122 can include resources 134, such as having all or a portion of a storage volume assigned to the pod. One or more pods 122 can be combined into a service 124, where the pods in a service can be located on the same computing system 114 or on different computing systems.

A cluster 110 can be managed by a control plane 138. Among other things, the control plane 138 can prove an API (not shown in FIG. 1) for interacting with the cluster 110 and its constituent components. The API can include methods for accessing custom resources defined for the cluster 110, and can implement an operator pattern for controlling such resources.

Figure 2:
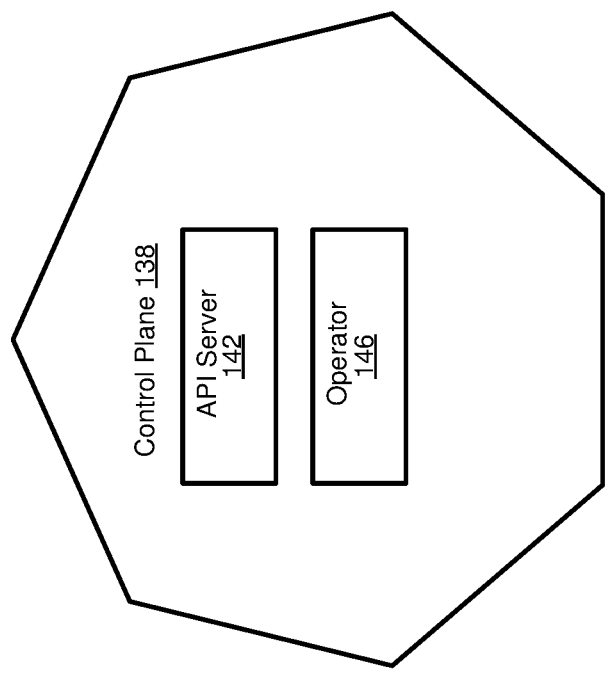
FIG. 2 is a diagram illustrating a control plane useable to manage the containerized applications in the computing environment of FIG. 1.

The control plane 138 is further shown in FIG. 2 as including an API server 142 and an operator 146.

Example 3)—Example Operator Process

Figure 3:
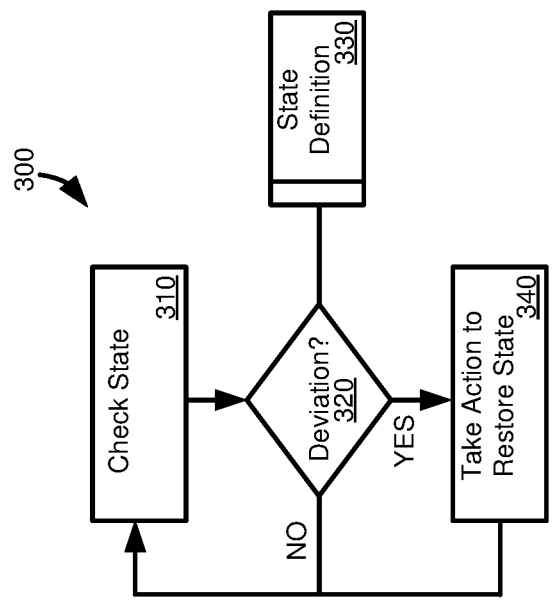
FIG. 3 is a flowchart of a method used by an operator pattern to manage resources, such as custom resources in the computing environment of FIG. 1.

FIG. 3 provides a flowchart of a method 300 that can be implemented by an operator, such as the operator 146 of FIG. 2. At 310, the method 300 checks the state of a computing environment. The method 300 consults a state definition 330 at 320 to determine if the current state deviates from the state as set forth in the state definition. If there is no deviation at 320, the method 300 returns to 310 (where 310 can be carried out, for instance, at specified intervals or upon specified triggering events). If it is determined at 320 that the current state deviates from the state definition 330, the operator takes action at 340 to restore the current state to the state according to the state definition 330. The method 300 then returns to 310.

Example 4)—Example Operator Process with State Definition Update

Figure 4:
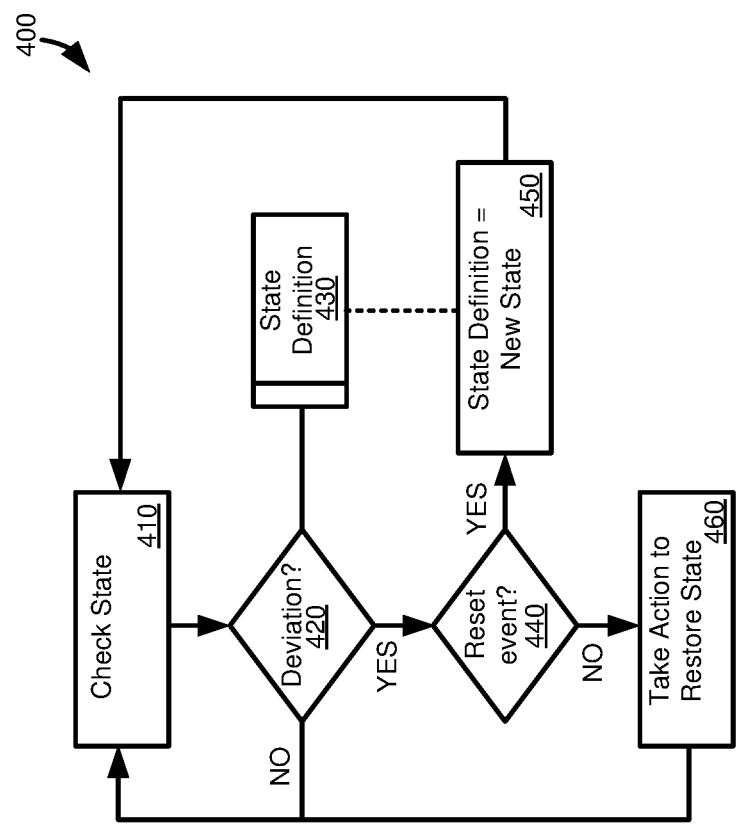
FIG. 4 is flowchart of a method of using an operator according to the present disclosure that can update its state definition when a qualifying event occurs.

FIG. 4 provides a flowchart of a method 400 according to the present disclosure. Like the method 300, the method 400 represents an operator pattern that checks the state of a computing environment and, in some cases, makes changes to return a current state of the computing environment to a defined state if necessary. Unlike the method 300, however, the method 400, in some circumstances, redefines a state definition according to a current state (or to another state, different than at least a portion of the current state definition used by the operator), rather than taking action to return the computing environment to a previously defined state.

At 410, the method 400 checks the state of a computing environment. The method 400 consults a state definition 430 at 420 to determine whether the current state deviates from the specified state. If no deviation is detected at 420, the method 400 returns to 410. If a deviation is detected, the method proceeds to 440.

At 440, the method 400 determines if an update event has occurred. In some implementations, an update event can be defined in terms of a parameter or characteristic of the computing environment that is specified by the state definition and one or more potential causes of a change to such parameter or characteristic. For example, a "whitelist" of causes can be provided, where if a cause is on the whitelist an update event will be raised. Or, a "blacklist" of causes can be provided, where if a cause is not on the blacklist an update event will be raised. Whether a particular cause is present, or particular conditions hold, can be determined in various ways, such as by checking a log (e.g., checking a log to determine that a database recovery recently occurred or by performing queries to determine if a particular scenario occurred or a particular set of conditions holds).

In other implementations, whether an update event has occurred can be specified in another manner. For example, certain actions can trigger the setting of an "update flag." At 440, the method 400 can determine if the update flag is set (or evaluates to TRUE).

If it is determined at 440 that an update action has occurred, the method 400 proceeds to 450, where the state definition 430 is updated, setting the expected value of the parameter or characteristic to the current value. The method 400 then returns to 410. If it is determined at 440 that an update action has not occurred, the method 400 proceeds to 460, where action is taken to restore the state of the computing environment to the state specified in the state definition 430. The method 400 then returns to 410.

Being able to determine why a computing environment differs from a defined state which an operator tries to maintain can be useful in some scenarios. While various actors may be able to change the state of a computing environment, it can be that some actors have a higher priority than the operator, and some may have a lower priority than the operator. When a change is made by a lower priority actor, then the operator may update the computing environment according to the state information used by the operator. If the change is made by a higher priority actor, then the operator changes its state definition to use the criteria associated with the higher priority actor.

Figure 5:
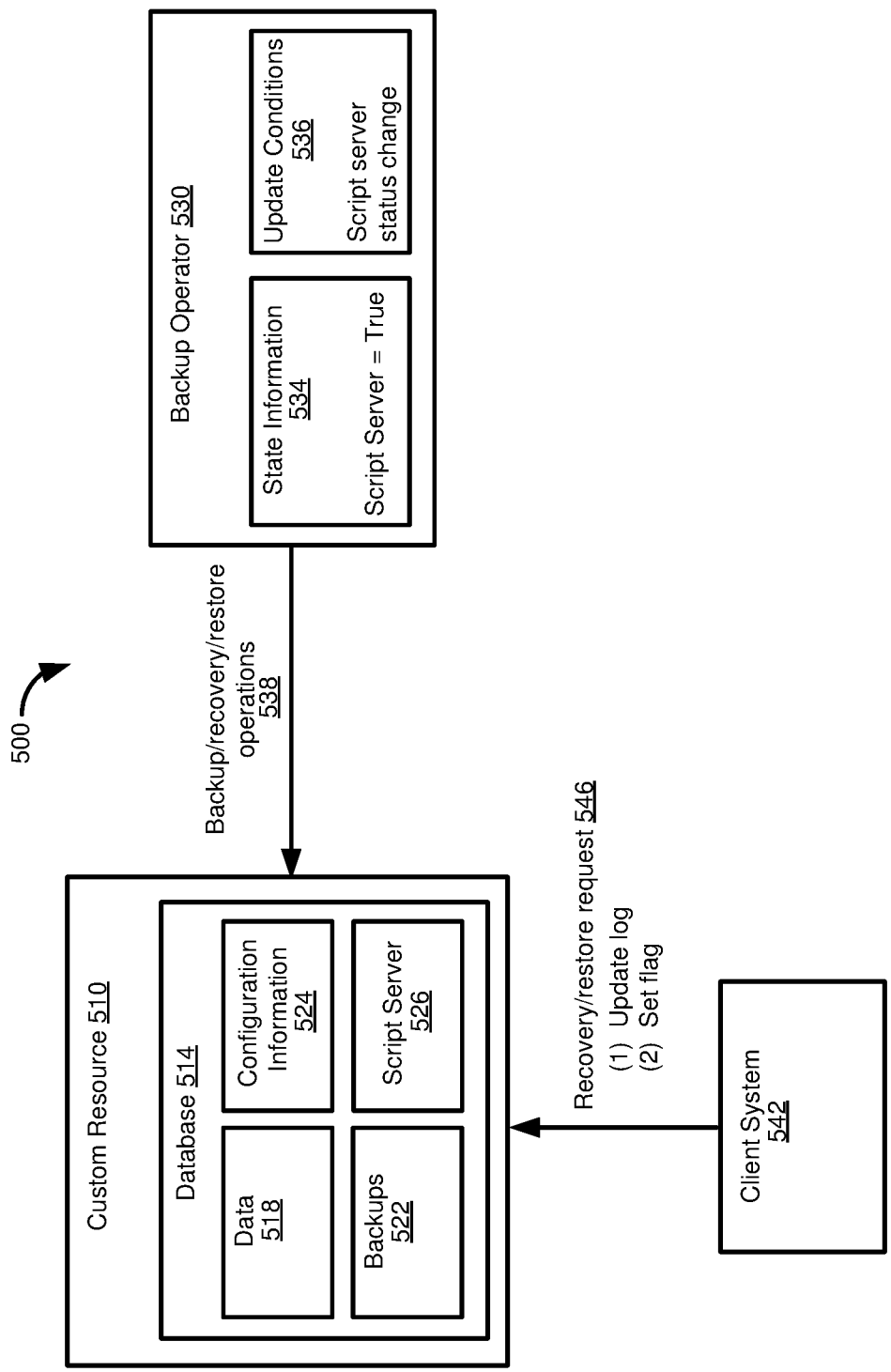
FIG. 5 is a diagram illustrating a computing environment where an operator pattern according to the present disclosure can be used to help manage backup and recovery operations for a database.

Example 5)—Example Operator with Dynamically Updatable State in Database Backup and Recovery FIG. 5 presents a computing environment 500 in which a particular use case of the disclosed operator can be implemented. The computing environment 500 can be implemented as part of the computing environment 100 of FIG. 1. That is, for example, at least a portion of the components of the computing environment 500 can be implemented inside of a cluster 110.

The computing environment 500 includes a custom resource 510. The custom resource 510 can include a database application (or functionality thereof) 514. In a specific example, a database application is containerized and the custom resource 510 represents backup and restore functionality for the database. The database 514 can include data 518 (e.g., relational database tables, OLAP cubes, a key-value store, data for a graph database, etc.). The database 514 can include other components, such as one or more database backups 522, configuration information 524, or functional components, such as a script server 526. In a specific example, the HANA database of SAP SE of Walldorf, Germany, is used as the database application and backup and restore functionality forms the custom resource 510 that is managed by a backup operator.

In a particular embodiment, the script server 526 corresponds to a script server as used in database products available from SAP SE, of Walldorf, Germany, such as the HANA database. The HANA script server can be included when it is desired to execute functions from an application function library. The HANA script server can be an optional component, and in some cases can be started manually. When HANA is managed using automation software, such as KUBERNETES, the presence of a script server 526, and action to start it, can be part of an operator, where a state definition can indicate whether or not a script server is part of a defined state.

A backup operator 530 is defined for the database 514. The backup operator 530 is configured to maintain the database 514 according to state information 534. The state information 534 can indicate that the state of the database 514 is such that the database should include the script server 526 (or, in another example, the state can be that a script server is not included). So, at least under some circumstances, the backup operator 530 periodically checks the state of the database 514, including to determine whether the script server 526 is running. If the script server 526 is not running, the backup operator 530 can take steps to make the database 514 consistent with the state information 534, such as by starting an instance of the script server (which can include terminating a prior instance of the script server, such as if the script server became non-responsive/stalled). The backup operator 530 can perform other functions 538, such as periodically causing backups 522 to be created, removing outdated backups, or causing the database 514 to be recovered from a backup.

A client system 542 can interact with the database 514. The client system 542 can issue read, write, and update requests to the database 514, affecting the data 518. However, the client system 542 can optionally perform other tasks on the database 514, such as issuing recovery or restore commands 546. A recovery or restore command 546 can cause the database 514 to enter a state that is inconsistent with the state information 534. For example, a user may request the database 514 return to a state when the script server 526 was not invoked. Thus, it may be inappropriate for the backup operator 530 to start the script server 526 in an attempt to comply with the state information 534.

As explained with respect to the method 400 of FIG. 4, the backup operator 530 can carry out an additional check before modifying the state of the database 514. For example, the backup operator 530 can check for the presence of or more update conditions 536, where if an update condition is present the backup operator updates the state information 534 rather than maintaining a state set forth in a prior definition of the state information. In one implementation, the recovery or restore operation requested by the client system 542 causes a flag to be set. Before modifying the state of the database 514, the backup operator 530 checks to see whether the flag is set. If the flag is set, the backup operator 530 does not update the state of the database 514, but rather updates the state information 534 (e.g., it sets Script Server=FALSE).

In another implementation, the recovery or restore operation requested by the client system 542 causes a log entry to be written. When the backup operator 530 determines that the script server 526 is not running, and thus deviates from the state information 534, the backup operator checks a log to see if a client-initiated backup or restore operation was requested (such as being requested within a particular timeframe, where the timeframe can correspond to a period between a current state check and a preceding state check). Since the log reflects a client-initiated recovery or restore operation, the backup operator 530 does not start the script server 526, but rather updates the state information 534 to indicate that the state of the database 514 should be that the script server is not running. If the log did not reflect a client-initiated recovery or restore operation, the backup operator 530 would cause the script server to execute.

Flags can be global or can be specific to a particular feature or parameter. That is, if any qualifying reset event occurs, the same flag is updated to TRUE for a global flag, while when individual flags exist, only the flag associated with a particular triggering event (which in turn is typically associated with one or more specified features or parameters) is set. In some cases, an overall result, or flag, can be updated along with updating any individual flags. For example, a logical OR operation can be conducted on the individual flags to provide an overall indication of whether some kind of reset event has occurred. If so, the individual flags can be checked to see what specific reset events occurred/what specific feature or parameters were associated with a reset event. Optionally, the global result can include a list of any features, parameters, or triggering events that evaluated to TRUE.

In a similar manner, the effect of a state reset or update can be made at different granularities depending on particular circumstances. That is, if an update event occurs, in some cases all state information is updated to a current state. In other cases, only specific features or parameters are updated to a current state (or other state) when an update event occurs.

Conditional operators used in conjunction with database recovery operations can include state information other than, or in addition to, the script server 526. For example, in some cases a user password is stored internally by the database and by an external component, which can be referred to as a vault. Typically, authentication of a user involves comparing the password stored in the database with the password stored in the vault. However, database recovery may result in the database storing a password that differs from that stored by the external component. For example, the password associated with the recovered database may be an old password, different from a current (or at least more current) password stored in the vault. In these circumstances, the operator can update stage information to provide that the current password is the password from the vault and can, for example, change the password stored in the database to that used by the vault.

In a similar manner, components other than the script server 526 can be managed by a conditional operator. In the example of the HANA database, additional components that can be associated with a conditional operator include database service processes such as a Data Provisioning Server or a Docstore.

Configuration information can also be state information associated with an operator whose behavior is conditional depending on whether a change to the configuration information results in a change to the state definition used by the operator or whether the operator changes the configuration information to match its current state information (or another state). State information in the form of configuration information can include configuration information related to backup processes, such a buffer size to be used when making backups, a default backup size, a default backup schedule, an amount of memory or other computing resources to be used during backup processes, definitions of what information is to be backed up and which information is to be excluded from back up, or information regarding a priority to be given to backup processes (e.g., as a result of recovery point objectives that might be associated with a service level agreement, particularly when the computing environment involves a hyperscalar computing environment which provides services to different clients, including at different service levels). In addition to starting or stopping optional services or modifying configuration settings, actions taken by an operator can include causing processes to be executed, such as executing a backup process or a recovery process.

Example 6)—Example Operator Suppression

Issues can arise if an operator is always active. That is, some activities, whether triggered by the operator or another actor, may result in changes to a managed computing environment that may be transiently inconsistent with a state sought to be maintained by the operator. Thus, it can be advantageous to suspend the operator until the relevant activity is concluded. At that time, the operator can determine whether any changes to the state of the computing environment might be needed and, if so, whether any update events might dictate that all or a portion of the state definition/information be updated, such as to reflect a current state.

In some cases, a computing system can use a signaling or locking mechanism (e.g., using a semaphore, mutex, or flag) to manage the operator. For example, in the case of a database undergoing a recovery process, it may be desirable for the operator to be disabled or delayed until the recovery process completes. The operator, before checking to see whether a computing environment matches state information (or performing maintenance or other actions if it is determined that the computing environment is inconsistent with the state information) can check whether a semaphore indicates that another process is operating such that the operator should pause its operation, or can check whether a mutex lock is obtained that prevents the operator from executing. In some cases, the operator can periodically check the status of the signal or locking mechanism to determine if it may resume operation. Or, the operator process can be queued and released once appropriate as indicated by the status of the signaling or locking mechanism.

Figure 6:
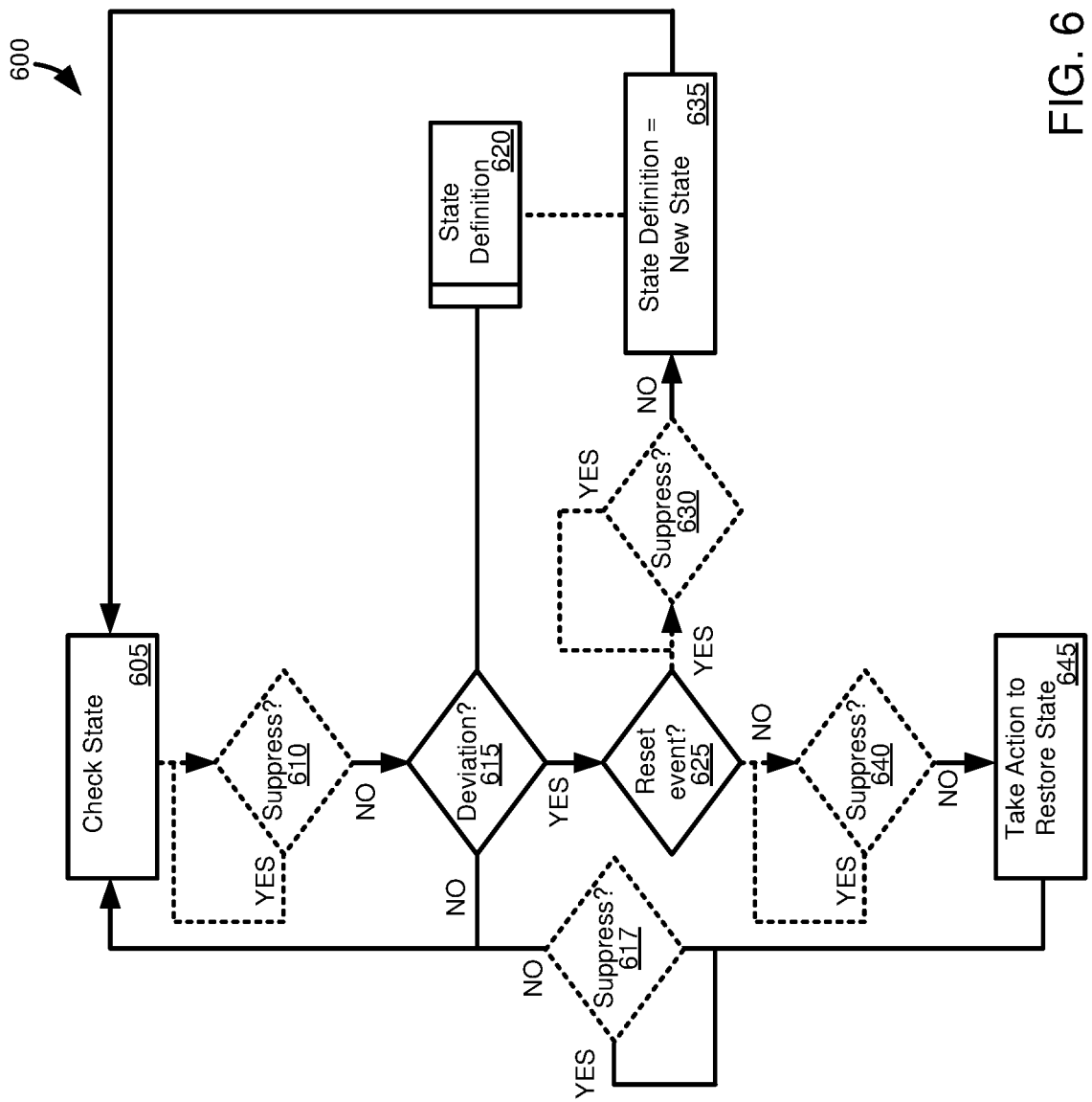
FIG. 6 is a flowchart of a method of using an operator according to the present disclosure, where action of the operator can be suppressed for a period of time, such as until a qualifying event completes.

FIG. 6 provides a flowchart of a method 600 where an operator can be suppressed for a period of time. At 605 the operator checks the state of a computing environment. At 610, optionally, it is checked whether action of the operator is to be suppressed, such as by checking the status of a semaphore or a mutex. If suppression is indicated, the method 600 loops back to 610. Looping at 610 can include periodically polling the computing system (e.g., the semaphore or mutex) to determine if operator suppression has ceased, or can include waiting until a notification is sent that the operator is no longer suppressed. If the operator is not suppressed, or it has been determined that the operator is no longer being suppressed, the method 600 proceeds to 615. Alternatively, the suppression check at 610 can occur prior to checking the state of the computing environment at 605, such as illustrated at 617.

At 615, the method 600 checks to see if a current state of the computing environment differs from an expected or specified state, as indicated by state definition 620. If no deviation is determined, the method 600 returns to 605 (or, 610, in embodiments where 610 is considered to occur before 605). If a deviation is determined at 615 to have occurred, the method 600 can proceed to 625, where it is determined whether an update event has occurred, which would result in all or a portion of state definition 620 being updated (rather than adjusting the state of the computing environment to match a previously defined state). If an update event was determined at 625 to have occurred, the method 600 can optionally proceed to 630 where it is determined whether the operator should be suppressed. If so, the method 600 loops back to 630, in a similar manner as described for 610. If it is determined at 630 that the operator is not suppressed, is no longer suppressed, or if 630 is omitted, the method 600 proceeds to 635, where at least a portion of the state definition 620 is updated. The method 600 then returns to 605 (or 610).

If it is determined at 625 that a reset event has not occurred, the method 600 optionally proceeds to 640, where it is determined whether the operator should be suppressed. If so, the method 600 can loop at 640 at described for 630 and 610. If it is determined at 640 that the operator is not suppressed or is no longer suppressed, or if 640 is omitted, the method 600 proceeds to 645. At 645, the operator makes changes to the computing environment to make its state consistent with the state definition 620. The method then returns to 605 (or 610).

In some embodiments of the present disclosure, only a single check is made to determine whether an operator should be suppressed. In particular, the suppression check of 617 or 610 is carried out, but not other suppression checks. In at least some cases, it can be advantageous to only suppress an operator when it is inactive (e.g., before it checks a state of the computing environment or before the operator determines whether a state of the computing environment is consistent with state information used by the operator). For example, in some scenarios, suppressing an operator that is active can itself lead to an inconsistent state.

Example 7)—Example State Update Using Conditional Logic

Previous Examples have described conditional operators that, if a condition is met (e.g., an update condition), state information used by the operator is modified to match a current state. In other implementations, an operator can update state information other than by using a current state if it is determined that the computing system is not in a state specified by current state information and an update event has occurred. For example, the state information itself can specify one or more values (or sources for such values) for a feature or parameter if a computing environment is not in an expected state and a reset has occurred. When multiple values are possible, additional logic can be used to determine which value should be used, such as logic that looks at other features or parameters of the computing environment, which can be features or parameters that are part of the state information or features or parameters that are not part of the state information.

In yet another example, where an update event has occurred, a user or process can be updated that the current state does not match the state defined by a state definition. The user or process can then provide state information that should be used by the operator, including maintaining the previous state information or updating the state information to match the current state.

Example 8—Example Implementations

Figure 7:
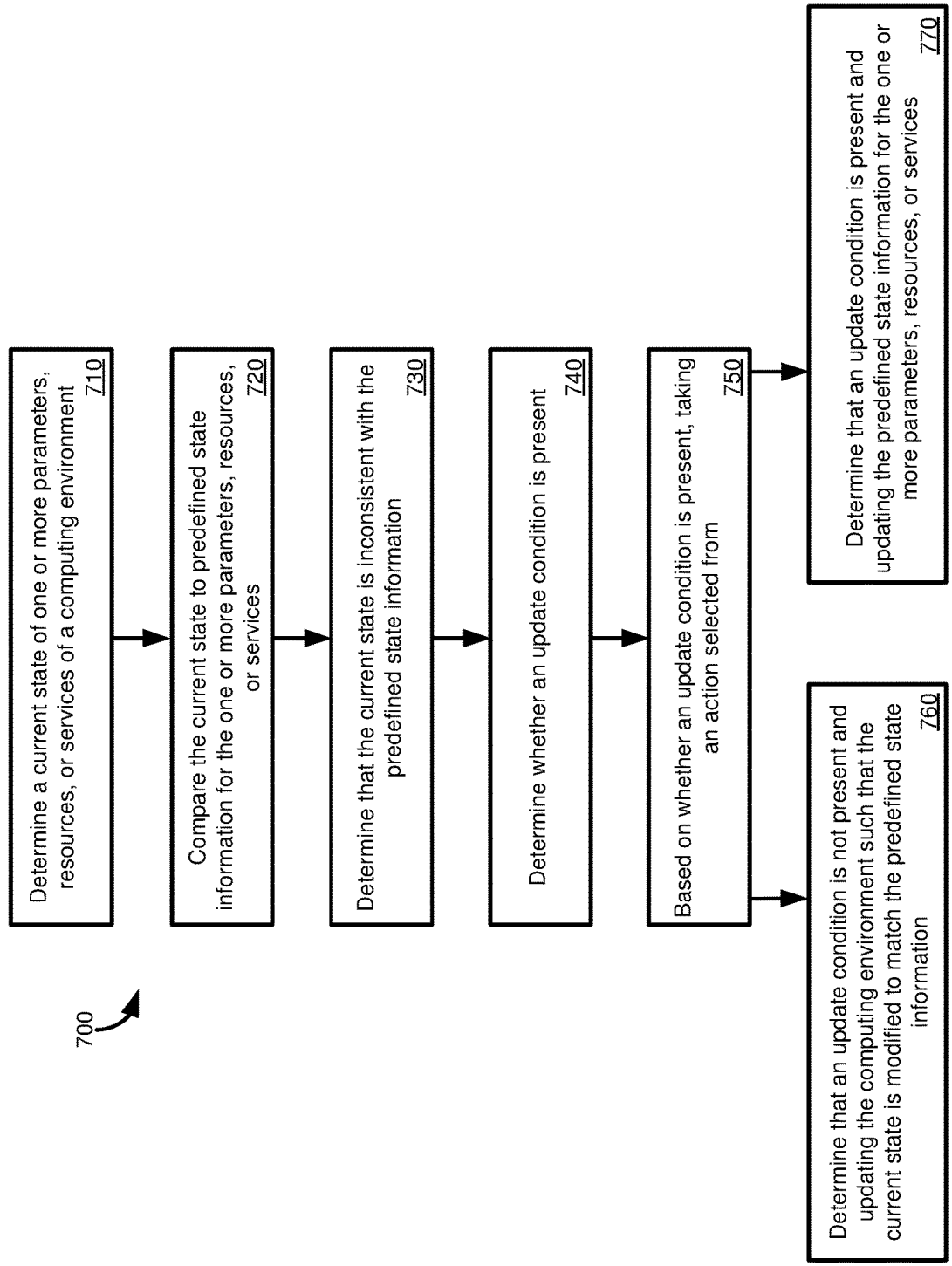
FIG. 7 is a flowchart illustrating operations according to a disclosed embodiment.

FIG. 7 illustrates a method 700 for determining whether an operator should update a computing system managed by the operator or update state information used by the operator, and taking appropriate subsequent action. The method 700 can be implemented in the computing environment 100 of FIG. 1 or the computing environment 500 of FIG. 5.

At 710, a current state of one or more parameters, resources, or services of a computing environment are determined. The current state is compared at 720 to predefined state information for the one or more parameters, resources, or services. It is determined at 730 that the current state is inconsistent with the predefined state information. At 740, it is determined whether an update condition is present. At 750, an action is taken based on whether an update condition is present. If an update condition is not present, the current state of the computing environment is modified at 760 to match the predefined state information. If an update condition is present, the predefined state information for the one or more parameters, resources, or services is updated at 770.

Example 9—Computing Systems

Figure 8:
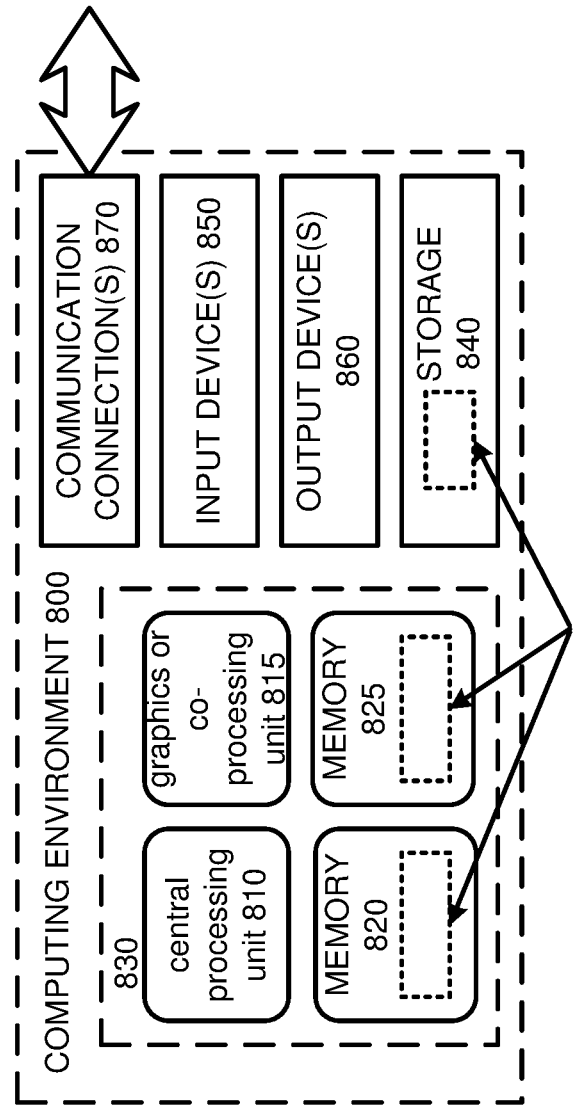
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing components of the environment 100 of FIG. 1 or the computing environment 500 of FIG. 5, including as described in Examples 1-8. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM (Random Access Memory)), non-volatile memory (e.g., ROM (Read-Only Memory), EEPROM (Electrically Erasable Programmable Read-Only Memory), flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs (Compat Disc-Read Only Memory), DVDs (Digital Versatile Disc), or any other medium which can be used to store information in a non-transitory way, and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer (Compact Disc-Writer), or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF (Radio Frequency), or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality.

Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 9:
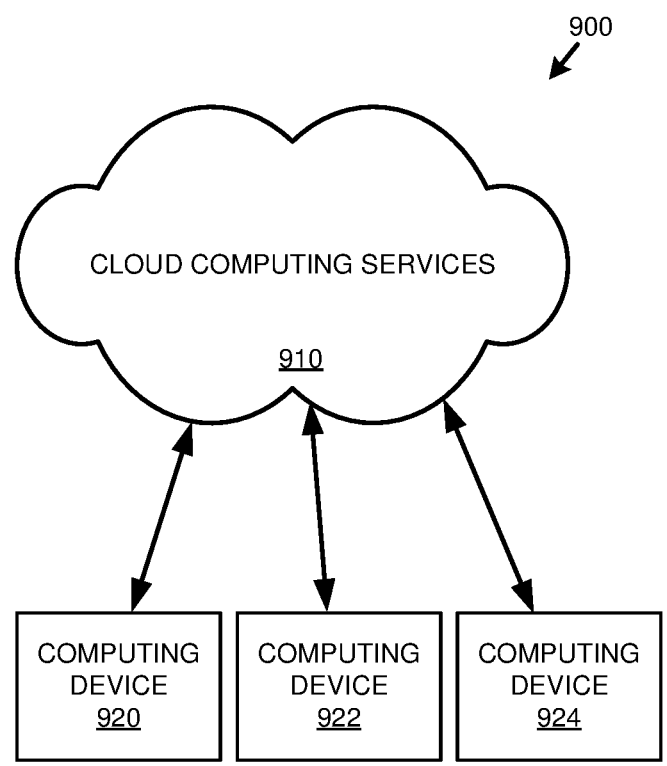
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 99. For example, the computing devices (e.g., 920, 922, and 99) can be computers (e.g., desktop or laptop computers), mobile devices (e.g., tablet computers or smart phones), or other types of computing devices. For example, the computing devices (e.g., 920, 922, and 99) can utilize the cloud computing services 910 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM (Dynamic Randon-Access Memory) or SRAM (Static Random-Access Memory)), or nonvolatile memory components (such as flash memory or hard drives)). By way of example, and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP (Advanced Business Application Programming), SQL (Structured Query Language), XCode, GO, Adobe Flash, or any other suitable programming language, or, in some examples, markup languages such as html (Hypertext Markup Language) or XML (Extensible Markup Language), or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer readable storage media storing computer-executable instructions that, during execution, cause the computing system to perform operations comprising:
   at a first time, obtaining a first current state of one or more parameters, resources, or services of a computing environment;
   comparing the first current state to a first version of predefined state information for the one or more parameters, resources, or services of the computing environment, wherein the computing system is configured to take action to restore the computing environment to be consistent with the first version of predefined state information if a deviation from the first version of predefined state information is detected;
   detecting an inconsistency between the first current state and the first version of predefined state information for a first parameter, resource, or service of the one or more parameters, resources, or services;
   verifying whether an update condition is present, wherein the update condition corresponds to an action performed in the computing environment and the update condition being present results in the first version of predefined state information being updated to reflect a current state associated with a state of a parameter, resource, or service of the one or more parameters, resources, or services that is inconsistent with the first version of predefined state information;
   based at least in part on the update condition not being present, updating the computing environment so that a status of the first parameter, resource, or service matches a state specified in the first version of predefined state information;
   at a second time, obtaining a second current state of the one or more parameters, resources, or services of the computing environment;
   comparing the second current state with the first version of predefined state information;
   detecting an inconsistency between the second current and the first version of predefined state information for the first parameter, resource, or service;
   verifying whether the update condition is present;
   based at least in part on the update condition being present, updating the first version of predefined state information to a second version of the predefined state information by:
     (1) for the first parameter, resource, or service, specifying for the first parameter, resource, or service in the second version of predefined state information the status of the first parameter, resource, or service the status of the first parameter, resource or service in the second current state;
     (2) selecting the second version of predefined state information from a plurality of state definitions based at least in part on one or more additional characteristics of the computing environment, wherein, in the second version of predefined state information, at least one of the one or more parameters, resources, or services has a state different than its state in the first version of predefined state information; or (3) notifying a user that the second current state is inconsistent with the first version of predefined state information; and receiving updated state information to be used as the second version of predefined state information for the one or more parameters, resources, or service of the computing environment, wherein, in the second version of predefined state information, at least one of the one or more parameters, resources, or services has a state different than its state in the first version of predefined state information.

2. The computing system of claim 1, wherein the updating the first version of predefined state information comprises (1).

3. The computing system of claim 1, wherein the updating the first version of predefined state information comprises (2).

4. The computing system of claim 1, wherein the updating the first version of predefined state information comprises (3).

5. The computing system of claim 1, the operations further comprising:
prior to the updating the first version of predefined state information,
delaying the updating the first version of the predefined state information until a conflicting activity is no longer conflicting.

6. The computing system of claim 5, wherein the conflicting activity is is an activity on a list of defined activities.

7. The computing system of claim 5, wherein the conflicting activity is indicated by a flag that has been set to indicate that a conflicting activity is executing.

8. The computing system of claim 5, wherein the operations are carried out by an operator implemented in software, the operations further comprising:
receiving, other than from the operator, a request to recover a state of a database;
wherein the conflicting activity is a recovery operation that is executing in response to the request.

9. The computing system of claim 1, wherein the update condition is verified by examining a status of a flag.

10. The computing system of claim 1, wherein the update condition is verified by examining a log.

11. The computing system of claim 1, wherein the one or more parameters, resources, or services of a computing environment form a first set and the update condition is verified by evaluating a current state of a second set of one or more parameters, resources, or services, wherein the first set and the second set differ by at least one element.

12. The computing system of claim 1, wherein the operations are carried out by an operator implemented in software, the operations further comprising:
receiving, other than from the operator, a request to recover a state of a database;
wherein the verifying whether an update condition is present comprises verifying that the request to recover a state of a database was received.

13. The computing system of claim 1, wherein the computing environment is managed at least in part by automation software and the operations are performed by the automation software.

14. The computing system of claim 1, wherein the computing environment comprises one or more containerized applications.

15. The computing system of claim 14, wherein the operations are carried out by automation software that manages the one or more containerized applications.

16. The computing system of claim 1, wherein the one or more parameters, resources, or services of a computing environment comprise at least one database service.

17. The computing system of claim 1, wherein the one or more parameters, resources, or services of a computing environment comprise at least one configuration setting for the computing environment.

18. The computing system of claim 1, wherein the one or more parameters, resources, or services of a computing environment are associated with a database executing in the computing environment.

19. One or more non-transitory computer-readable storage media comprising:
computer-executable instructions that, during execution by a computing system comprising at least one hardware processor and at least one memory coupled to the at least one hardware processor, cause the computing system to, at a first time, obtain a current state of one or more parameters, resources, or services of a computing environment;
computer-executable instructions that, during execution by the computing system, cause the computing system to compare the first current state to a first version of predefined state information for the one or more parameters, resources, or services of the computing environment, wherein the computing system is configured to take action to restore the computing environment to be consistent with the first version of predefined state information if a deviation from the first version of predefined state information is detected;
computer-executable instructions that, during execution by the computing system, cause the computing system to detect an inconsistency between the first current state and the first version of predefined state information for a first parameter, resource, or service of the one or more parameters, resources, or services;
computer-executable instructions that, during execution by the computing system, cause the computing system to verify whether an update condition is present, wherein the update condition corresponds to an action performed in the computing environment and the update condition being present results in the first version of predefined state information being updated to reflect a current state associated with a state of a parameter, resource, or service of the one or more parameters, resources, or services that is inconsistent with the first version of predefined state information;
computer-executable instructions that, during execution by the computing system, cause the computing system to, based at least in part on the update condition not being present, update the computing environment so that a status of the first parameter, resource, or service matches a state specified in the first version of predefined state information;
computer-executable instructions that, during execution by the computing system, cause the computing system to, at a second time, obtain a second current state of the one or more parameters, resources, or services of the computing environment;
computer-executable instructions that, during execution by the computing system, cause the computing system to compare the second current state with the first version of predefined state information;

computer-executable instructions that, during execution by the computing system, cause the computing system to detect an inconsistency between the second current state and the first version of predefined state information for the first parameter, resource, or service;

computer-executable instructions that, during execution by the computing system, cause the computing system to verify whether the update condition is present;

computer-executable instructions that, during execution by the computing system, cause the computing system to, based at least in part on the update condition being present, update the first version of the predefined state information to a second version of predefined state information by:

(1) for the first parameter, resource, or service, specifying for the first parameter, resource, or service in the second version of predefined state information the status of the first parameter, resource, or service the status of the first parameter, resource or service in the second current state;

(2) selecting the second version of predefined state information from a plurality of state definitions based at least in part on one or more additional characteristics of the computing environment, wherein, in the second version of the predefined state information, at least one of the one or more parameters, resources, or services has a state different than its state in the first version of predefined state information; or (3) notifying a user that the second current state is inconsistent with the first version of predefined state information; and receiving updated state information to be used as the second version of predefined state information for the one or more parameters, resources, or services of the computing environment, wherein, in the second version of predefined state information, at least one of the one or more parameters, resources, or services has a state different than its state in the first version of predefined state information.

20. A method, implemented in a computing environment comprising a computing system comprising at least one hardware processor and at least one memory coupled to the at least one hardware processor, the method comprising:

with an automation software program that implements an operator pattern that interacts with a control plane of a computing cluster comprising a plurality of virtual machines and provides a software agent that periodically polls the state of the computing system and takes action to bring the computing system back to a specified state if a state indicating by the polling does not conform to a specified state, at a first time, obtaining a first current state of one or more parameters, resources, or services of a computing environment using an application programming interface exposed by the control plane;

with the automation software, comparing the first current state to a first version of predefined state information for the one or more parameters, resources, or services of the computing environment, wherein the first version of predefined state information does not specify actions to be taken if the first current state does not conform with the first version of predefined state information;

with the automation software, detecting an inconsistency between the first current state and the first version of predefined state information for a first parameter, resource, or service of the one or more parameters, resources, or services;

with the automation software, verifying whether an update condition is present, wherein the update condition corresponds to an action performed in the computing environment and the update condition being present results in the first version of predefined state information being updated to reflect a current state associated with a state of a parameter, resource, or service of the one or more parameters, resources, or services that is inconsistent with the first version of predefined state information;

with the automation software, based at least in part on the update condition not being present, without user intervention, updating the computing environment by issuing commands through the application programming interface so that a status of the first parameter, resource, or service matches a state specified in the first version of predefined state information;

with the automation software, at a second time, obtaining a second current state of the one or more parameters, resources, or services of the computing environment using the application programming interface;

with the automation software, comparing the second current state with the first version of predefined state information;

with the automation software, detecting an inconsistency between the second current state and the first version of predefined state information for the first parameter, resource, or service;

determining with the automation software, verifying whether the update condition is present;

with the automation software, based at least in part on the update condition being present, updating the first version of predefined state information to a second version of predefined state information by:

(1) for the first parameter, resource, or service, without user intervention, specifying for the first parameter, resource, or service in the second version of predefined state information the status of the first parameter, resource, or service the status of the first parameter, resource or service in the second current state;

(2) without user intervention, selecting the second version of predefined state information from a plurality of state definitions based at least in part on one or more additional characteristics of the computing environment, wherein, in the second version of predefined state information, at least one of the one or more parameters, resources, or services has a state different than its state in the first version of predefined state information; or (3) notifying a user that the second current state is inconsistent with the first version of predefined state information; and receiving through the application programming interface user input providing user input providing updated state information to be used as the second version of predefined state information for the one or more parameters, resources, or services of the computing environment, wherein, in the second version of predefined state information, at least one of the one or more parameters, resources, or services has a state different than its state in the first version of predefined state information.

* * * * *